United States Patent [19]

Pelchat et al.

[11] Patent Number: 4,653,053
[45] Date of Patent: Mar. 24, 1987

[54] PERFORMANCE MONITORING OF ANTIJAM SATELLITE COMMUNICATION NETWORK

[75] Inventors: Guy M. Pelchat, Indianlantic; Robert W. Boyd, Melbourne, both of Fla.

[73] Assignee: Harris Corporation, Melbourne, Fla.

[21] Appl. No.: 609,315

[22] Filed: May 11, 1984

[51] Int. Cl.⁴ .......................................... G06F 11/10
[52] U.S. Cl. ..................................... 371/43; 371/37
[58] Field of Search .................. 371/43, 44, 45, 37, 371/39, 40; 364/481; 325/363; 324/57 N; 375/39, 27, 43

[56] References Cited

U.S. PATENT DOCUMENTS

| | | | |
|---|---|---|---|
| 4,074,201 | 2/1978 | Lennon | 364/481 |
| 4,074,228 | 2/1978 | Jonscher | 371/45 |
| 4,130,818 | 12/1978 | Synder | 371/43 |
| 4,291,406 | 9/1981 | Bahl | 371/44 |
| 4,322,848 | 3/1982 | Synder | 371/37 |
| 4,328,582 | 5/1982 | Battail et al. | 371/43 |
| 4,520,490 | 5/1985 | Wei | 375/39 |

Primary Examiner—Michael R. Fleming
Attorney, Agent, or Firm—Antonelli, Terry & Wands

[57] ABSTRACT

A scheme for monitoring the performance of a multiple access satellite communication network, particularly an antijam pseudo-noise spread code division multiple access network, operational in the presence of one or more up-link jammers having arbitrary waveforms, wherein the probability of error (or some directly related quantity) in the output data is considered to be the measure of link quality. Measurements on signal quality received over a selected (strong) link are performed at a prescribed (control) terminal. Such measurements include deriving a statistical mean and variance of decision voltages on a symbol-by-symbol basis. The measured means and variances are processed to account for differences in the link parameters of any desired link and the link used for measurement. The means and variances for the desired link are further processed to give output error probability, accounting for any error correction decoding in use. The desired link may be one of the actual links in the network or another link whose parameters differ from the links of the network.

36 Claims, 4 Drawing Figures

PERFORMANCE MONITORING OF ANTIJAM SATELLITE COMMUNICATION NETWORK

The U.S. Government has rights in the subject matter of the present patent application under Contract No. DAAK 80-81-C-0103 to the U.S. Army SATCOMA, RTACS.

FIELD OF THE INVENTION

The present invention relates, in general, to communication systems, and is particularly directed to the performance monitoring of an antijam pseudo-noise spread code division multiple access communication network employing a satellite transponder, in the presence of one or more up-link jammers producing arbitrary waveforms.

BACKGROUND OF THE INVENTION

The integrity of a multiterminal satellite communication network may depend, in many instances, upon the ability of the links (terminal-transponder-terminal) to exhibit robustness against jamming. The type of jamming to which the network may be subjected is not predictable (e.g. CW jamming vs. pulse jamming) so that countermeasures against such jamming are not preassignable. Moreover, the impact of pulse jamming on communication links operating at different data rates is not as defineable as it is for CW jamming. Thus, in order to accurately predict the quality of communications between any two terminals in the network, performance measurements must be carried out.

SUMMARY OF THE INVENTION

In accordance with the present invention, there is provided a new and improved scheme for monitoring the performance of a multiple access satellite communication network, particularly an antijam pseudo-noise spread code division multiple access network, operational in the presence of one or more up-link jammers having arbitrary waveforms. In the monitoring scheme of the present invention the probability of error (or some directly related quantity) in the output data is considered to be the measure of link quality.

Pursuant to the invention, measurements of signal quality received over a selected (strong) link are performed at a prescribed (control) terminal. Such measurements include deriving a statistical mean and variance of decision voltages representative of received signals on a symbol-by-symbol basis. The mean and variance statistics are then processed to give the error probability at the output of an error correction decoder which forms part of the modem equipment with which the performance monitoring system of the present invention is associated. This error probability can be computed based upon parameters of the actual links in the network or for another link whose parameters differ from the links of the network.

Advantageously, in accordance with the present invention the probability of error prediction is essentially independent of the predicted error rate, which contrasts to a direct measurement technique where the measurement time increases as probability of error decreases. In addition, output data error probability is derived without the need for the transmission of known data. Also, as mentioned earlier, jammer characterization data, (which may not be known) such as a peak power, pulse length, etc. are not required. Finally, knowledge of limiting characteristics of the satellite transponder is not required.

DETAILED DESCRIPTION

Figure 1:
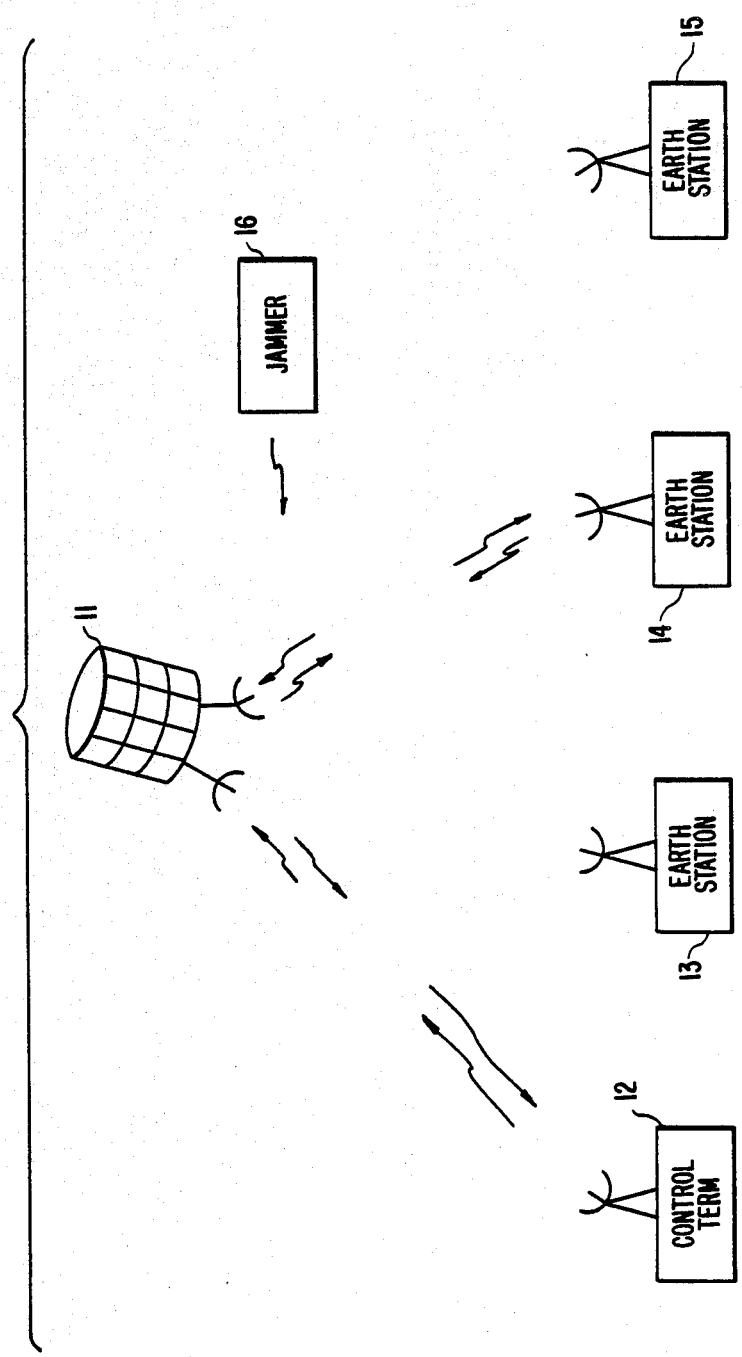
FIG. 1 is a schematic illustration of a multiterminal antijam satellite communication network.

Referring now to FIG. 1 of the drawings, there is shown a diagrammatic illustration of a multiterminal antijam satellite communication network comprised of a plurality of geographically spaced terminals (earth stations) 12, 13, 14 and 15 that contain transceiver equipment for communicating with one another over a common frequency channel via satellite transponder 11. To provide robustness against interference, such as from one or more up-link jammers 16, the communication scheme employed by the terminals of the network is preferably a spread spectrum communication scheme. For purposes of the present description, the scheme chosen is pseudo-noise code division multiple access (PN CDMA). As the details of both the technique and equipment configuration for carrying out PN CDMA communications are described in the literature and unnecessary for an understanding of the performance monitoring technique of the present invention they will not be described here. Instead, the explanation to follow will describe the technique itself and a preferred embodiment of the hardware and software employed for implementing the invention.

In an antijam satellite communication network such as shown in FIG. 1, it is common practice to configure one of the earth stations, e.g. terminal 12, as a control site for conducting supervisory tasks, establishing network timing, etc. Pursuant to the present invention, as part of this equipment, the control terminal (terminal 12 in the present example) contains performance monitoring equipment, to be described in detail below in conjunction with the description of FIG. 2, which carries out measurements on a selected one of the communication links (terminal transponder-terminal), and from those measurements is capable of predicting the quality of the communication links between any terminals in the network. Advantageously, as mentioned briefly above, and as will be appreciated from the description to follow, even in the presence of one or more up-link jammers 16, which may be non-constant envelope (pulse) jammers, the signal measurement and prediction process according to the invention will accurately describe the performance of the other links, independent of the output of jammers, (i.e. without having to measure the characteristics of the jammer).

Before describing the configuration and operation of performance monitoring equipment employed by the control terminal, it is useful to consider the impact of an injected up-link noise source upon communications between terminals through the satellite transponder. By up-link (UL) is meant the fact that the noise-contaminating source impacts the signal transmitted from a source earth station to the satellite transponder, so that the signal received by the transponder for amplification and retransmission to the down-link (DL) receiving earth station contains the effect of the jammer. As a result, the effect of the jammer is to cause the transponder to transmit (the same amount of) noise to all terminals. If the amplifiers in the satellite transponder are saturated, as is often the case, the effect of the noise of the jammer will be a reduction in the gain of the transponder by the same amount for all links. From these effects it can be seen that there is commonality among all links with respect to the impact of the jammer.

As mentioned briefly above, the control terminal measures the performance of a selected communication link and from this measurement predicts the quality of communication links between any terminals in the network. For this purpose, and referring again to FIG. 1, control terminal 12 may transmit a prescribed spread spectrum signal to satellite transponder 11 and monitor the returned signal. Since control terminal 12 sources the signal it may set the level of transmission to assure that the received signal is a sufficiently strong signal. However, control terminal 12 need not monitor itself, but it may monitor the signal received from any other terminal in the network. When monitoring a signal transmitted from another terminal, control terminal 12 measures the received power in all received signals and selects the strongest signal (by tuning its receiver to the appropriate PN code) for measurement. Thus, with the signal being monitored being a strong signal, the effective gain of the satellite transponder may be readily measured by measuring the amount of effective power received on that strong signal. By also measuring the effective noise power in the received signal, and knowing preestablished characteristics of each of the links in the network (e.g. how much power is transmitted, antenna dish size, etc.) the monitoring equipment at the control terminal is able to predict the performance of any link in the network.

Before describing, in detail, the particular improved AJ link performance monitoring scheme in accordance with the present invention, it should be observed that the invention resides primarily in a novel combination of conventional signal recovery hardware (e.g. receiver, filters, etc.) and intercoupled processors, which carry out performance analysis data processing tasks on the recovered signal-representative values obtained from the signal recovery hardware. Accordingly, the structure, control and arrangement of such components have been illustrated in the schematic diagram of FIG. 2 by readily understandable block representations which show only those specific details that are pertinent to the present invention, in order not to obscure the disclosure with structural details which will be readily apparent to those skilled in the art having the benefit of the description herein. In addition, illustration of the signal processing equipment has been appropriately consolidated into processor units dedicated to specific signal processing tasks, the details of which are described below, in order to emphasize those portions that are most pertinent to an understanding of the present invention. Thus, the block diagram illustration of FIG. 2 does not necessarily represent the mechanical structure arrangement of an exemplary performance monitoring subsystem, but is primarily intended to depict the major equipment components of the measurement/performance prediction portion of a control terminal in a convenient functional grouping, whereby the present invention may be more readily understood.

Figure 2:
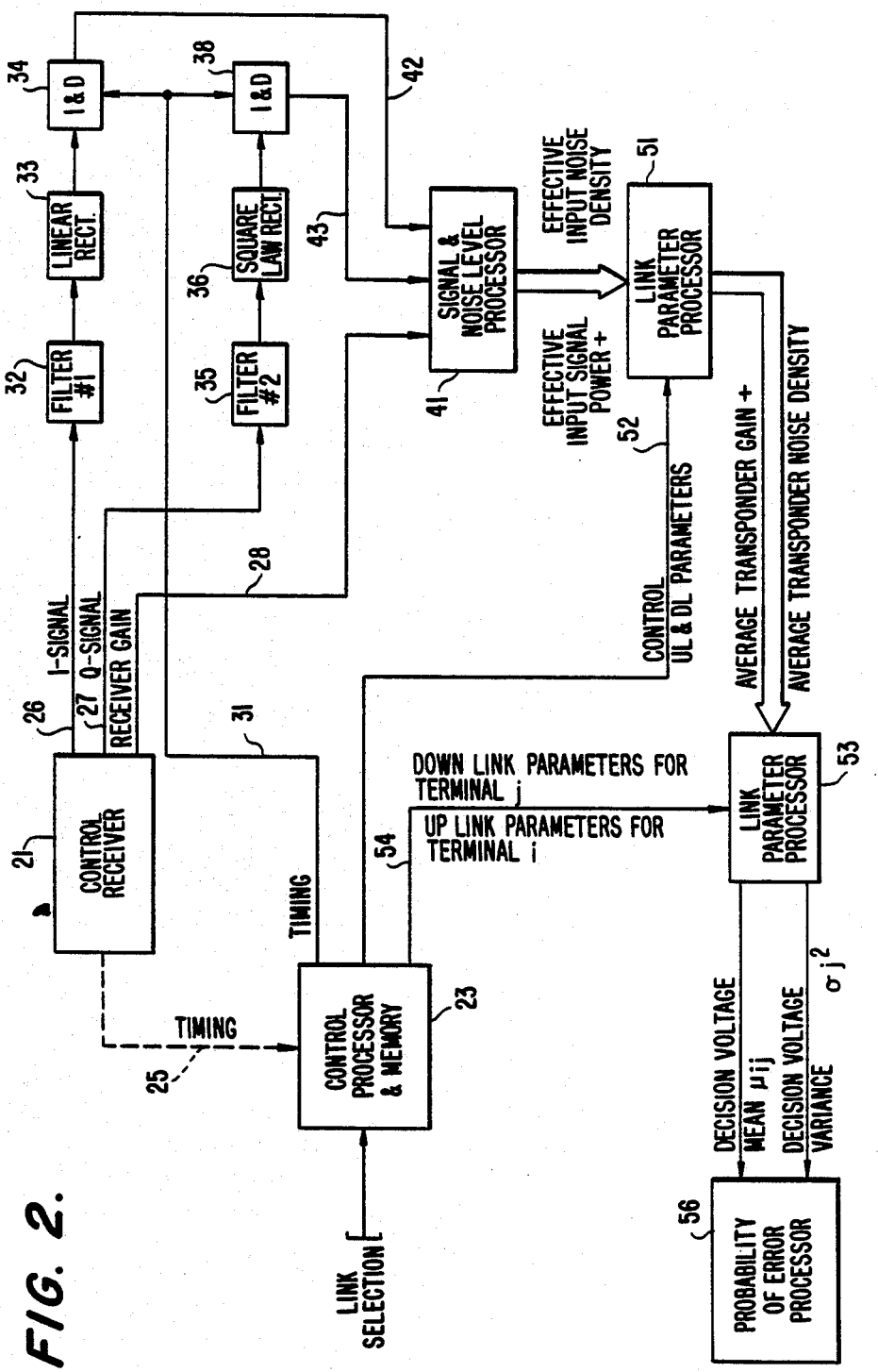
FIG. 2 is a schematic block diagram of the performance measurement equipment contained in a control terminal of the network of FIG. 1.

Referring now to FIG. 2, a schematic block diagram of the signal recovery and performance monitoring equipment employed in a control terminal is shown as including a control receiver 21 which is tuned to the selected AJ link, termed the network control link. As mentioned previously, the control terminal's receiver is capable of being tuned (via a PN code selection input) to any network signal of interest (preferably a strong signal from which transponder gain and noise measurements may be obtained). This strong signal may be transmitted by the control terminal itself, or be selected from signals transmitted from other network terminals by setting the appropriate PN code control parameters in the receiver, as from a control processor 23. Processor 23, including associated memory, contains an a priori knowledge of fixed up-link and down-link parameters (e.g. transmitter power level, antenna dish size, data rate, etc.) for each of the terminals in the network, which data are selectively accessed to provide parametric data for subsequent signal processing to be explained below. For purposes of the present description of the signal recovery aspects of the performance monitoring equipment of FIG. 2, processor 23 provides timing information over link 31 representative of the symbol rate of the link under investigation.

It should be noted that this symbol rate is not necessarily the symbol rate of the "strong" signal selected for reception by control receiver 21. As an example, letting the control terminal itself be the source of the signal to be monitored, such as binary PSK data, the symbol rate is preferably chosen to be relatively low (e.g. 100 bps) compared with the actual data rate of a communication signal (e.g. 10kbps) normally employed by a terminal. Thus, for such an example processor 23 supplies, over link 31, timing signals for sampling a pair of integrate and dump circuits corresponding to a one hundred microsecond symbol span (10 kpbs data rate), even though the signal being transmitted and received is at a 100 bps symbol rate.

The received signal, containing both the binary PSK data and any noise on which measurements are to be carried out, is coherently demodulated. Control receiver 21 has a pair of output lines 26 and 27 over which it supplies an in-phase (I) baseband signal and a quadrature-phase (Q) baseband signal. The I-signal on line 26 contains the baseband data contained in the control signal plus a broadband noise component (jammer contamination). The Q-signal on line 27 contains a small residual signal component due to the carrier loop phase error in the receiver plus a broadband noise component (jammer contamination). The I-signal is coupled to a lowpass filter 32 the output of which is applied to a linear rectifier 33 to eliminate the effect of the control data (or data on the link selected for measurement). Low pass filter 32 has a bandwidth which is wide compared to the symbol rate of interest (here 10 kbps) but not so wide that its signal-to-noise ratio is low. The output of linear rectifier 33 is coupled to an integrate and dump circuit 34 which operates at the desired symbol rate under the control of timing signal on line 31, to produce an average of the output of linear rectifier 33 as a sequence of symbol values which are proportional to the effective transponder gain during corresponding respective symbol times. This sequence of symbol values is coupled over line 42 as a first data input to a signal-plus-noise level processor 41, the operation of which will be described below.

The Q-signal output from control receiver 21 on output line 27 is coupled to a lowpass filter 35 which has a wide bandwidth (e.g. 25% of the PN spreading rate) the output of which is applied to a square law detector 36 and the resulting signal is coupled to integrate and dump circuit 38, operating in synchronism with integrate and dump circuit 34 via a timing signal line 31. Integrate and dump circuit 38 produces a sequence of values which are proportional to the sum of the effective noise density of the transponder and the control terminal. These noise density representative values are coupled over line 43 as a second data input to signal-plus-noise level processor 41.

Figure 3:
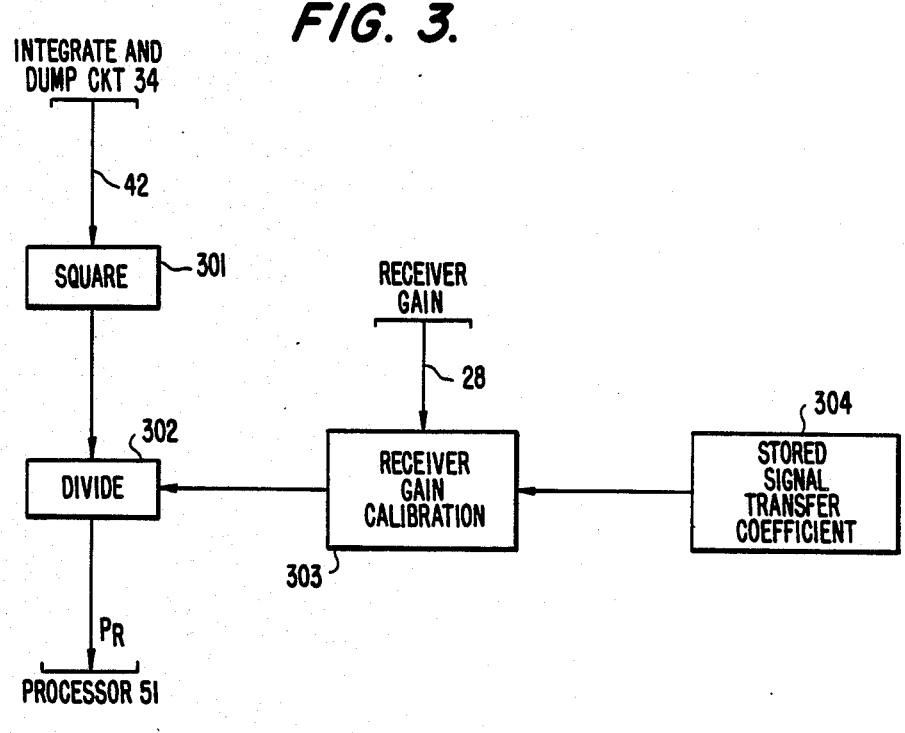
FIG. 3 is a flow chart illustrating the manner in which effective signal power $P_R$ received from the satellite transponder is determined by processor 41.

In processor 41 the signal and noise representative values supplied over lines 42 and 43 are referenced to the terminal input point where the control terminal's antenna gain and system noise temperature (or noise density) are specified. For this purpose, a voltage level corresponding to receiver gain is coupled over line 28 as a third data input to processor 41. In addition signal and noise calibration data and system noise temperature data have been loaded in processor 41 as pre-established data values for completing the referencing operation. Using these data input and the stored calibration data on the measuring equipment processor 41 calculates effective input signal power and effective noise density as shown in the flow chart of FIGS. 3 and 4. For determining effective signal power received from the satellite, processor 41 carries out the series of operations shown in FIG. 3. As shown therein, the output of integrate and dump circuit 34 is squared (step 301) and then divided (step 302) by the results of calibrating the receiver gain (step 303). As noted above, for this calibration process, the receiver gain coupled over line 28 from control receiver 21 is adjusted in accordance with previously stored signal transfer coefficients 304. The thus obtained value of effective signal power from the satellite transponder is coupled to processor 51.

Figure 4:
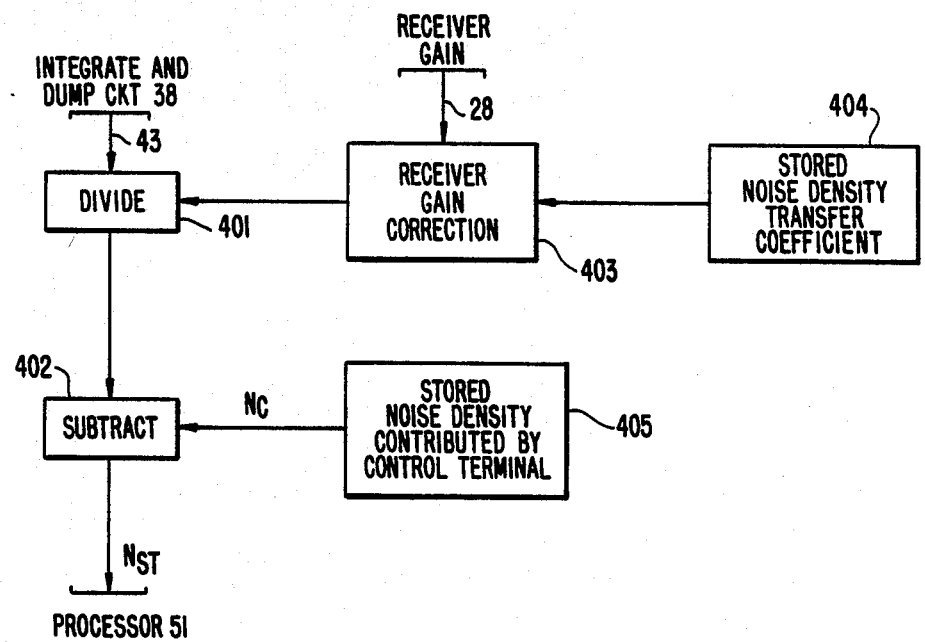
FIG. 4 is a flow chart illustrating the manner in which effective input noise density N received from the satellite transponder is determined by processor 41.

The steps carried out by processor 41 for determining effective input noise density received from the satellite are shown in FIG. 4. The noise representative value coupled over link 43 from integrate and dump circuit 38 is divided (step 401) by the results of receiver correction (step 403). In step 403 the receiver gain value on line 28 from control processor 21 is corrected in accordance with previously stored noise density transfer coefficients (404). The noise density value obtained by step 401 is then adjusted by subtracting (step 402) a previously stored noise density value calibrated by the control terminal (405). This adjusted quantity corresponding to the effective input noise density received from the satellite transponder, and is coupled to processor 51, together with the value of the effective signal power from the satellite derived by processor 41, as explained above in conjunction with the description of FIG. 3 so that the value obtained by processor 41 constitutes a first set of data inputs to link parameter processor 51. A second set of inputs corresponding to uplink and downlink parameters from control processor 23 are coupled over link 52 to link parameter processor 51. Using these parameters and the data values supplied by processor 41, processor 51 produces, for each symbol value, a pair of outputs corresponding to effective transponder gain and effective noise density. For computing effective satellite transponder gain, processor 51 employs a value $P_T$ corresponding to the originally transmitted power, a value ULL corresponding to uplink loss, a value DLL corresponding to downlink loss and value $P_R$ corresponding to received downlink power. The values $P_T$, ULL, DLL are supplied over link 52 from control processor 23; the value $P_R$ is derived from processor 41. Using these values, processor 51 can compute the effective satellite transponder gain $G_T$ in accordance with the expression $$G_T = \frac{P_R}{(P_T \cdot ULL \cdot DLL)} \tag{1}$$

Link loss between a terminal and the satellite transponder may be computed or measured and for purposes of the present description is assumed to be known. A standard expression for determining link loss is the formula $$LL = (g_t g_r \lambda^2 L)/(4\pi R)^2 \tag{2}$$

wherein $g_t$ is transmitting antenna gain in the direction of the transmitting antenna, $\lambda$ is wavelength, R is the range separating the antennas and L is a factor accounting for incidental loss such as rain, fog, etc.

For computing the effective output noise density $N_{ST}$ of the satellite transponder processor 51 divides the effective noise density N computed by processor 41 by the satellite transponder/control terminal link loss (DLL); i.e. $N_{ST} = N/DLL$. It should be noted that processor 51 updates its outputs at the symbol rate of interest to accommodate unknown time varying jammers. For constant envelope jammers the outputs of processor 51, however, should be constant from symbol to symbol and also should be independent of the data rate of interest.

The values of effective transponder gain and noise density computed by link parameter processor 51 are coupled to a second link parameter processor 53 which calculates decision voltage means and variance values for any specified link of interest i.e. processor 53 is programmed to determine the decision voltage mean and variance for any selected (or defined) different terminal-pair.

As mentioned previously a terminal modem may contain an error correction decoder which outputs digital data on the basis of decision voltage for each symbol received. As data probability of error (or some directly related quantity) may be considered to be a measure of link quality, the decision voltage values (in terms of statistical means and variance) are processed on a symbol-by-symbol basis. To accomplish this task, processor 53 requires knowledge of reference uplink parameters for the designated source terminal (terminal i) and downlink parameters for the receiver terminal (terminal j) under consideration. These are derived from the control processor's memory and coupled via link 54 to processor 53. Using the effective transponder gain and noise density values derived by processor 51, together with these uplink and downlink parameters for the terminal pair (ij) under consideration, processor 53 may calculate a decision voltage mean $\mu_{ij}$ and decision voltage variance $\sigma_j^2$ in accordance with the following formulas.

$$(\mu_{ij})^2 = 2C_j(PT_i)(ULL_i)(G_T)(DLL_j)T_S, \tag{3}$$

$$\sigma_j^2 = C_j[(N_{ST})(DLL_j) + NS_j] \tag{4}$$

In these formulas the various symbols are defined as follows:

$\mu_{ij}$—mean value of the decision voltage;
$\sigma_j^2$—variance of the decision voltage;
$C_j$—receiver gain of jth terminal from the antenna reference point to the output of the integrate and dump circuit which produces the decision voltage;
$PT_i$—power transmitted by the $i^{th}$ terminal;
$ULL_i$—link loss between the $i^{th}$ terminal transmitting antenna and the satellite transponder receiving antenna;
$G_T$—satellite transponder effective gain from processor 51;
DLL—link loss between the satellite transponder transmitting antenna and the $j^{th}$ terminal antenna;
$T_S$—data symbol length of interest;
$N_{ST}$—effective transponder noise density from processor 51;
$N_{Sj}$—noise density contributed by the $j^{th}$ terminal.

Again the parameters $PT_i$, $ULL_i$, $C_j$, $N_{Sj}$ are assumed known and available from memory in processor 23.

As mentioned previously, a terminal modem contains an error correction decoder which outputs digital data on the basis of decision voltage for each symbol received. As data probability or error (or some directly related quantity) may be considered to be a measure of link quality, the decision voltage values (in terms of statistical mean and variance) are processed on a symbol-by-symbol basis. With link parameter processor 53 having derived these decision values $\mu_{ij}$ and $\sigma_j^2$ from effective transponder gain and output noise density values, on a symbol-by-symbol basis as supplied from processor 51, these decision values may then be processed to predict error probability for prescribed error correction coding techniques. Such processing is carried out in probability of error processor 56 which may execute one of the algorithms, described below, depending upon the type of error correction coding employed. The discussion to follow will detail various algorithms though the execution of which processor 56 may compute probability of error in response to the decision voltage mean $\mu_{ij}$ and variance $\sigma_j^2$ values supplied by processor 53.

UNCODED CASE

Computing probability of error for the uncoded case is straightforward. Given the mean decision voltage $\mu_{ij}$ and the standard deviation $\sigma_j$ for a link originating at the $i^{th}$ terminal and terminating at the $j^{th}$ terminal, the symbol error probability is defined as $$p = Q\left(\frac{\mu_{ij}}{\sigma_j}\right) \qquad (5)$$

where $$Q(X) = \frac{1}{\sqrt{2\pi}} \int_x^\infty e^{-x^2/2} dx \qquad (6)$$

If the ratio $\mu_{ij}/\sigma_j$ changes from symbol to symbol, then p will also change from symbol to symbol, and processor 56 computes a time varying symbol error probability sequence $P_k$, $P_{k+1}$,—. This sequence can be processed to suit network user requirements. In some applications the user might be interested in the symbol probability of error averaged over some number of symbols. In others, the user might be interested in word error probability. For example, if data words are M symbols long, then the word error probability for a word beginning on the $k^{th}$ symbol is $$P_w = 1 - \prod_{l=k}^{k+M} q_l \qquad (7)$$

where $q_l = 1 - p_l$, is the probability that the $l^{th}$ symbol is correct. The word error probability may depend on word timing, and the user may wish to know $P_w$ for a particular word timing phase or for all phases. Again, the user may wish to average $P_w$ over some number of words.

CODED CASE

Computing the probability of error for a link employing error correction coding is somewhat more difficult than for an uncoded link. However, for any linear code it is possible to compute error probability from the decision voltage and noise variance measurements by using appropriate modifications of well known techniques such as code enumeration and union bounding. Almost all useful codes are linear and thus have the property that error probabilities may be computed independent of the transmitted data. Two examples of typical computations that may be executed by processor 56 are set forth below.

Hard-Decision Decoding of a Block Code using a Bounded Distance Algorithm.

An (N,K) block code maps K information symbols into N code symbols (for ease of discussion binary symbols will be assumed.) The transmission corresponding to a codeword is demodulated into an N bit sequence at the receiver. This sequence is the sum of the codeword plus some error pattern that is caused by channel noise. A bounded distance decoder will decode to the correct codeword if and only if the Hamming weight of the error pattern is less than equal to $t = \triangle[d_{min}/2]$, where $d_{min}$ is the minimum distance between codewords and [x] denotes the greatest integer $\leq x$. Hence, the probability of word error in decoding equals the probability of encountering an error pattern with weight greater than t. This is given by $$P_w = \sum_{k=t+1}^{N} P_k \qquad (8)$$

where $p_k$ denotes the probability of observing any error pattern of weight k. There are $$\binom{N}{k}$$

distinct error patterns of length N having weight k. With constant signal and noise levels, the probability of each weight k pattern is equal to that of any other weight k pattern which makes consideration of the individual patterns unnecessary. In the network under consideration, the signal and/or noise level can change from bit to bit making the usual simplification incorrect. However, the $p_k$ terms may still be computed exactly (e.g. by enumeration or convolution), approximated (e.g. by gaussian or poisson random variables), or bounded (e.g. by a Chernoff bound). Word error probability may be approximated (actually underbounded) by a simpler calculation that sums probabilities of error patterns over any subset of the range that cause decoding errors. Decoded bit error probability is well approximated by assuming that every decoding error results in selecting a nearest neighbor codeword, resulting in $$P_b = \frac{d_{min}}{N} P_w \quad (9)$$

Of course, many variations on this computational procedure might be more appropriate for the particular code parameters or computational processor available. The above is given simply for purposes of an exemplary processing technique.

Soft-Decision Maximum Likelihood Decoding of a Convolutional Code

When soft-decisions are used, or maximum likelihood decoding of a convolutional code is employed, it becomes desirable to evaluate a union bound. A union bound involves considering the decoding process as comparing the correct code sequence to every other code sequence, one at a time. The overall sequence error probability is overbounded by the sum of the error probabilities associated with each of these comparisons. The probability of error in deciding between the correct sequence and another possible code sequence (say sequence i) for an unquantized decoder is:

$$p_2(i) = Q\left(\frac{\mu_i}{\sigma_i}\right), \quad (10)$$

where $\mu_i$ is the sum of the decision voltage in the bit positions where the code sequences differ and $\sigma_i^2$ is the sum of the noise variances in these positions. Since signal and/or noise can vary from bit to bit, both $\mu_i$ and $\sigma_i$ are functions of the exact bit positions where the sequences differ and their ratio is a function of circuit gain prior to detection. An overbound on decoded bit error probability is obtained by including the information sequence weight ($w_i$) associated with code sequence i; that is $$P_b = \frac{1}{m} \sum_i w_i Q\left(\frac{\mu_i}{\sigma_i}\right) \quad (11)$$

for a rate m/n code. Since $\mu_i/\sigma_i$ is not independent of the exact bit locations in the difference pattern, it is not possible to replace the individual sequence information weights ($w_i$) with the sum over all sequences having identical difference pattern weights as is usually done. In practice, the union bound calculation is truncated after considering a fixed number of possible code sequences which eliminates the guarantee of an overbound, but usually results in a better approximation to actual performance. An underbound on sequence and bit error probability is obtained by evaluating any one term (usually chosen to be the largest) of the union bound.

The exact data processing algorithm used to translate adjusted signal and noise measurements for the channel symbols into decoded error probabilities is a function of the coding/decoding algorithm employed by the system and the computational power available. The result of this decoded error probability calculation will be a function of time and must be processed (and possibly time averaged) to obtain the final parameter of interest. If interleaving/deinterleaving is used in the system, the signal and noise measurements must be correspondingly deinterleaved before processing. There are various levels of synchronization which may be accounted for, or ignored, as desired. In any case, knowledge of signal voltages and noise variances on a symbol-by-symbol basis allows either exact or approximate evaluation of the performance of a coded communication link.

As will be appreciated from the foregoing description, the present invention offers a new approach to network performance quality monitoring and error probability prediction. Advantageously statistics of the decision voltages on any link to be employed in error correction decoding circuitry can be obtained from measurements on any strong link received at the control terminal. Decision voltage statistics on a symbol-by-symbol basis can be used to compute error probability at the output of the error correction decoder as a function of time. Moreover, probability of error predictions are essentially instantaneous, independent of the predicted error rate. This is in contrast to a direct measurement technique where the measurement time increases as the probability of error decreases. The time required makes direct measurements impractical at low data rates. Output data error probability is obtained without the need for the user to transmit known data. In addition, jammer characterization data, such as peak power, pulse length, etc., are not required. Also, transponder limiting characteristics are not required.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use in a communications system wherein a plurality of stations communicate with one another via a transponder remote with respect to said stations, a method of measuring the performance of a communication link between a prescribed transmitting station, said transponder and a prescribed receiving station comprising the steps of:
   (a) at a first selected one of said stations, receiving signals transmitted from a second selected one of said stations via said transponder;
   (b) from the signal received in step (a), deriving a first output signal representative of a prescribed characteristic of said transponder at a symbol rate associated with signals transmitted by said prescribed transmitting station, and a second output signal representative of a prescribed characteristic of said received signals; and
   (c) processing said first and second output signals derived in step (b) in accordance with preselected parameters associated with said communication link so as to obtain a measurement of the performance of said communication link.

2. A method according to claim 1, wherein said prescribed characteristic of said transponder corresponds to the effective gain of said transponder and said prescribed characteristic of said received signals corresponds to the effective transponder noise density.

3. A method according to claim 2, wherein said transponder comprises a satellite transponder.

4. A method according to claim 2, wherein said first and second selected ones of said stations correspond to the same selected station.

5. A method according to claim 4, wherein said symbol rate of signals transmitted from and received by said same selected station is different from the symbol rate associated with signals transmitted by said prescribed transmitting station.

6. A method according to claim 2, wherein said preselected parameters include preestablished uplink parameters of a communication link between said prescribed transmitting station and said transponder, and preestablished downlink parameters between said transponder and said prescribed receiving station.

7. A method according to claim 2, wherein a receiving station contains a decoder for recovering data symbols in accordance with data decision signal levels and wherein step (c) includes the step of deriving first data $\mu_{ij}$ representative of the mean value of decision signal levels on symbols transmitted from said prescribed transmitting station i and received at said prescribed receiving station j and second data representative of the variance $\sigma^2_j$ of said decision signal levels.

8. A method according to claim 7, wherein said prescribed receiving station j includes an error correction decoder for correcting errors in data symbols contained in signals received at said receiving station j transmitted over said communication link from said prescribed transmitting station i, and step (c) includes the step of calculating the probability of error at the output of said error correction decoder in accordance with said first and second data.

9. A method according to claim 8, wherein step (c) includes the step of compensating said first and second data in accordance with variations in the gain of the receiver at said prescribed receiving station j.

10. A method according to claim 8, wherein step (b) comprises deriving a first signal representative of the signal power in the received signal equivalent to continuous wave signal power and a second signal representative of noise density received from said transponder.

11. A method according to claim 10, wherein step (b) includes the steps of
  (b1) processing said first signal in accordance with preselected uplink parameters associated with the link between said second selected one of said stations and said transponder and in accordance with preselected down link parameters associated with the link between said transponder and said first selected one of said stations to obtain said first output signal, and
  (b2) processing said second signal in accordance with preselected downlink parameters associated with the link between said transponder and said first selected one of said stations to obtain said second output signal.

12. A method according to claim 1, wherein signals received at said first selected one of said stations are spread spectrum encoded signals.

13. For use in a communications system wherein a plurality of stations communicate with one another via a transponder remote with respect to said stations, a method of measuring the quality of a communication link between a prescribed transmitting station i, said transponder and a prescribed receiving station j, said prescribed receiving stations j containing a decoder for recovering data symbols, transmitted by said prescribed transmitting station i, in accordance with data symbol decision signal levels, a said method comprising the steps of:
  (a) deriving first data $\mu_{ij}$ representative of the mean value of decision signal levels on symbols transmitted from said prescribed transmitting station i and received at said prescribed receiving station j, and second data representative of the variance $\sigma_j^2$ of said decision signal levels; and
  (b) calculating the probability of error in recovered data symbols at the output of said decoder in accordance with said first and second data so as to obtain said quality of said communication link.

14. A method according to claim 13, wherein said communication link is a spread spectrum communication link.

15. A method according to claim 13, wherein said first and second data are derived in response to signals conveyed over a selected communication link between terminal stations via said transponder, said conveyed signals containing data symbols having a symbol data rate other than the data rate associated with symbols transmitted from said prescribed transmitting station.

16. A method according to claim 15, wherein step (b) includes the step of compensating said first and second data in accordance with variations in the gain of the receiver at said prescribed receiving station j.

17. A method according to claim 13, wherein step (a) comprises deriving a first signal representative of the signal power in a received signal equivalent to continuous signal power, and a second signal representative of noise density received from said transponder.

18. A method according to claim 17, wherein step (a) includes the steps of
  (a1) processing said first signal in accordance with preselected uplink parameters associated with said selected communication link to obtain said first data, and
  (a2) processing said second signal in accordance with preselected downlink parameters associated with said selected communication link to obtain said second data.

19. For use in a communications system wherein a plurality of stations communicate with one another via a transponder remote with respect to said stations, an apparatus for measuring the performance of a communication link between a prescribed transmitting station, said transponder and a prescribed receiving station comprising, at a first selected one of said stations:
  first means for receiving signals transmitted from a second selected one of said stations via said transponder;
  second means for deriving, from the signal received by said first means, a first output signal representative of a prescribed characteristic of said transponder at a symbol rate associated with signals transmitted by said prescribed transmitting station, and a second output signal representative of a prescribed characteristic of said received signals; and
  third means for processing said first and second output signals derived by said second means in accordance with preselected parameters associated with said communication link so as to obtain a measurement of the performance of said communication link.

20. An apparatus according to claim 19, wherein said prescribed characteristic of said transponder corresponds to the effective gain of said transponder and said prescribed characteristic of said received signals corresponds to the effective transponder noise density.

21. An apparatus according to claim 20, wherein said transponder comprises a satellite transponder.

22. An apparatus according to claim 20, wherein said first and second selected ones of said stations correspond to the same selected station.

23. An apparatus according to claim 22, wherein said symbol rate of signals transmitted from and received by said same selected station is different from the symbol rate associated with signals transmitted by said prescribed transmitting station.

24. An apparatus according to claim 20, wherein said preselected parameters include preestablished uplink parameters of a communication link between said prescribed transmitting station and said transponder, and preestablished downlink parameters between said transponder and said prescribed receiving station.

25. An apparatus according to claim 20, wherein a receiving station contains a decoder for recovering data symbols in accordance with data decision signal levels and wherein said third means includes means for deriving first data $\mu_{ij}$ representative of the mean value of decision signal levels on symbols transmitted from said prescribed transmitting station i and received at said prescribed receiving station j and second data representative of the variance $\sigma^2_j$ of said decision signal levels.

26. An apparatus according to claim 25, wherein said prescribed receiving station j includes an error correction decoder for correcting errors in data symbols contained in signals received at said receiving station j transmitted over said communication link from said prescribed transmitting station i, and said third means includes means for of calculating the probability of error at the output of said error correction decoder in accordance with said first and second data.

27. An apparatus according to claim 26, wherein said third means includes means for compensating said first and second data in accordance with variations in the gain of the receiver at said prescribed receiving station j.

28. An apparatus according to claim 26, wherein said second means includes means for deriving a first signal representative of the signal power in the received signal equivalent to continuous wave signal power and a second signal representative of noise density received from said transponder.

29. An apparatus according to claim 28, wherein said second means includes means for processing said first signal in accordance with preselected uplink parameters associated with the link between said second selected one of said stations and said transponder and in accordance with preselected downlink parameters associated with the link between said transponder and said first selected one of said stations to obtain said first output signal, and processing said second signal in accordance with preselected downlink parameters associated with the link between said transponder and said first selected one of said stations to obtain said second output signal.

30. An apparatus according to claim 19, wherein signals received at said first selected one of said stations are spread spectrum encoded signals.

31. For use in a communications system wherein a plurality of stations communicate with one another via a transponder remote with respect to said stations, an apparatus measuring the quality of a communication link between a prescribed transmitting station i, said transponder and a prescribed receiving station j, said prescribed receiving stations j containing a decoder for recovering data symbols, transmitted by said prescribed transmitting station i, in accordance with data symbol decision signal levels, said apparatus comprising first means for deriving first data $\mu_{ij}$ representative of the mean value of decision signal levels on symbols transmitted from said prescribed transmitting station i and received at said prescribed receiving station j, and second data representative of the variance $\sigma^2_j$ of said decision signal levels; and second means for calculating the probability of error in recovered data symbols at the output of said decoder in accordance with said first and second data derived by said first means so as to obtain said quality of said communication link.

32. An apparatus according to claim 31, wherein said communication link is a spread spectrum communication link.

33. An apparatus according to claim 31, wherein said first and second data are derived by said first means in response to signals conveyed over a selected communication link between terminal stations via said transponder, said conveyed signals containing data symbols having a symbol data rate other than the data rate associated with symbols transmitted from said prescribed transmitting station.

34. An apparatus according to claim 33, wherein said second means includes means for compensating said first and second data in accordance with variations in the gain of the receiver at said prescribed receiving station j.

35. An apparatus according to claim 31, said first means includes means for deriving a first signal representative of the signal power in a received signal equivalent to continuous signal power, and a second signal representative of noise density received from said transponder.

36. An apparatus according to claim 35, wherein said first means includes means for processing said first signal in accordance with preselected uplink parameters associated with said selected communication link to obtain said first data, and processing said second signal in accordance with preselected downlink parameters associated with said selected communication link to obtain said second data.

* * * * *